US011886180B2

(12) United States Patent
Suresh et al.

(10) Patent No.: US 11,886,180 B2
(45) Date of Patent: Jan. 30, 2024

(54) METHOD AND SYSTEM FOR FACILITATING PREDICTIVE MAINTAINANCE OF TESTING MACHINE

(71) Applicant: CLARITRICS INC., New York, NY (US)

(72) Inventors: Praveen Kumar Suresh, Salem (IN); Sriram Rajkumar, Chennai (IN); Sudarsun Santhiappan, Chennai (IN)

(73) Assignee: CLARITRICS INC., New York, NY (US)

( * ) Notice: Subject to any disclaimer, the term of this patent is extended or adjusted under 35 U.S.C. 154(b) by 7 days.

(21) Appl. No.: 17/685,128

(22) Filed: Mar. 2, 2022

(65) Prior Publication Data

US 2023/0280737 A1    Sep. 7, 2023

(51) Int. Cl.
*G05B 23/02* (2006.01)
*G05B 19/418* (2006.01)

(52) U.S. Cl.
CPC ..... *G05B 23/0283* (2013.01); *G05B 19/4183* (2013.01); *G05B 19/4188* (2013.01); *G05B 19/41885* (2013.01)

(58) Field of Classification Search
CPC .... G05B 23/00; G05B 23/02; G05B 23/0205; G05B 23/0259; G05B 23/0283;
(Continued)

(56) References Cited

U.S. PATENT DOCUMENTS 7,457,785 B1 * 11/2008 Greitzer ................. G07C 3/00
706/12
2006/0195201 A1 * 8/2006 Nauck .................. G05B 17/02
700/44
(Continued)

FOREIGN PATENT DOCUMENTS

KR         10-2226687 B1    3/2021
WO    WO-2021/092845 A1    5/2021

OTHER PUBLICATIONS

Gugulothu, N., et al., "Predicting Remaining Useful Life using Time Series Embeddings based on Recurrent Neural Networks," in Proceedings of 2nd ML for PHM Workshop at Special Interest Group on Knowledge Discovery and Data Mining, Canada, Aug. 2017 (SIGKDD).
Wang, T., et al., "Data-driven prognostic method based on self-supervised learning approaches for fault detection," Journal of Intelligent Manufacturing, 31:1611-1619 (2020).
Yang, H., et al., "Remaining useful life prediction for machinery by establishing scaled-corrected health indicators," Measurement, vol. 163, 108035 (2020).

*Primary Examiner* — Son T Le
*Assistant Examiner* — Matthew W. Baca
(74) *Attorney, Agent, or Firm* — Foley & Lardner LLP

(57) ABSTRACT

The present disclosure describes a method, system, and computer readable medium for facilitating predictive maintenance of testing machine using a combination of deep learning. The method comprises performing receiving plurality of tested data of a plurality of products being tested by the testing machine. The method further comprises applying a predictive model, having predictive model parameters, upon the plurality of tested data to predict a plurality of future test data corresponding to the plurality of products. The method further comprises determine a deviation between the plurality of tested data and the plurality of future test data, wherein the deviation indicates fault in the testing machine. The method further comprises determine a fault level of the testing machine by comparing the deviation with a predefined threshold and determining, during runtime, the maintenance required for the testing machine based on the fault level.

18 Claims, 6 Drawing Sheets

(58) Field of Classification Search
CPC ............ G05B 19/4183; G05B 19/4188; G05B 19/41885; G01R 31/00; G01R 31/26; H01H 2229/018; H01L 22/00; H01L 22/10; H01L 22/12; H01L 22/14; H01L 22/34
See application file for complete search history.

(56) References Cited

U.S. PATENT DOCUMENTS

2020/0011927 A1\* 1/2020 Kagami ................. G01R 35/00
2020/0379454 A1\* 12/2020 Trinh ................... G05B 23/024

\* cited by examiner

300

300

METHOD AND SYSTEM FOR FACILITATING PREDICTIVE MAINTAINANCE OF TESTING MACHINE

TECHNICAL FIELD

The present disclosure generally relates to machine learning. Particularly, the present disclosure relates to a method and a system for facilitating predictive maintenance of a testing machine using the machine learning.

BACKGROUND

A testing machine is most crucial instrument in a manufacturing industry that confirms the fitness and functionality of a product. Mainly, the testing machine verifies the fitness of the product manufactured with respect to standard specification designated for the product and confirms whether the product is fit (meeting the expected results) or unfit (not meeting the expected results). However, like any other machine, the testing machine may also become faulty or deteriorated and may provide erroneous results such as considering a fit product as unfit (False Positive) and an unfit product as fit (False Negative). Such kind of situation may impose a challenge in the industry about the fitness of products that are tested by the faulty testing machine. Further, such a deteriorated state of the testing machine results in loss of revenue, material, time, and even brand reputation.

To overcome such situation, it is always advisable to schedule maintenance of the testing machine at regular intervals. However, it is often observed that repair or replacement of components of the testing machine is not required during each maintenance cycle and that leads to unnecessary downtime for the machine. In such scenario, it is desirable to develop efficient techniques for predicting maintenance of the testing machine by monitoring parameters that are indicative of machine/component health conditions. Predictive maintenance uses condition-monitoring tools/techniques to detect the future condition (normal/deteriorated) of the testing machine. Predictive maintenance enables the maintenance manager to schedule the maintenance to repair/replace the machine/component that reduces maintenance cost, maximize equipment lifespan, optimize employee productivity, and increase revenue.

Predicting maintenance is a complex and challenging task. Traditional techniques of predictive maintenance use supervised learning method or unsupervised learning methods which leads to inaccurate results. Particularly, in the supervised learning technique, data preparation and pre-processing is always a challenge and in the unsupervised learning technique it is quite difficult to get precise information regarding data sorting and classification. Thus, identifying accurate information about the components of testing machine that requires maintenance in advance is still regarded as a complex problem and it is desirable to develop efficient techniques for facilitating predictive maintenance of testing machine that can provide information about repair and/or replacement of components, reasons of deteriorated state of testing machine etc. ahead of time.

The information disclosed in this background section is only for enhancement of understanding of the general background of the invention and should not be taken as an acknowledgement or any form of suggestion that this information forms the prior art already known to a person skilled in the art.

SUMMARY

One or more shortcomings discussed above are overcome, and additional advantages are provided by the present disclosure. Additional features and advantages are realized through the techniques of the present disclosure. Other embodiments and aspects of the disclosure are described in detail herein and are considered a part of the disclosure.

An object of the present disclosure is to predict whether a testing machine is operating in optimal condition or deteriorated condition by monitoring the measurements of the product or the testing machine, ahead of time.

Another objective of the present disclosure is to identify appropriate reasons due to which the testing machine or its components goes into deteriorated state.

Another object of the present disclosure is to accurately identify the component of the testing machine that requires repair or replacement ahead of time.

Yet another object of the present disclosure is to provide enough time and information to the maintenance engineer to take corrective correction and plan for resources.

Still another object of the present disclosure is to improve productivity of the manufacturing industry by ensuring the quality check of the testing machine in judicious manner.

The above stated objects as well as other objects, features, and advantages of the present disclosure will become clear to those skilled in the art upon review of the following description, the attached drawings, and the appended claims.

According to an aspect of the present disclosure, methods, system, and computer readable media are provided for facilitating predictive maintenance of testing machine.

In a non-limiting embodiment of the present disclosure, the present application discloses a method for facilitating predictive maintenance of a testing machine. The method may comprise receiving plurality of tested data of a plurality of products being tested by the testing machine, wherein each tested data comprises one or more output parameters generated by the testing machine on providing one or more input parameters associated with the product. The method may further comprise applying a predictive model, having predictive model parameters, upon the plurality of tested data in order to: predict a plurality of future test data corresponding to the plurality of products, determine a deviation between the plurality of tested data and the plurality of future test data, wherein the deviation indicates fault in the testing machine. The method may further comprise determine a fault level of the testing machine by comparing the deviation with a predefined threshold, wherein the predefined threshold indicates a maximum tolerance level up to which the testing machine is considered to be fit. The method may further comprise determine, during run-time, the maintenance required for the testing machine based on the fault level.

In another non-limiting embodiment of the present disclosure, the present application discloses a system for facilitating predictive maintenance of a testing machine. The system may comprise a memory and at least one processor, wherein the at least one processor is in electronic communication with the memory. The at least one processor may be configured to receive plurality of tested data of a plurality of products being tested by the testing machine, wherein each tested data comprises a one or more output parameters generated by the testing machine on providing one or more input parameters associated with the product. The at least one processor may be further configured to apply a predictive model having predictive model parameters, upon the plurality of tested data in order to predict a plurality of future test data corresponding to the plurality of products. The at least one processor may be further configured to determine a deviation between the plurality of tested data and the plurality of future test data, wherein the deviation indicates fault in the testing machine. The at least one processor may be further configured to determine a fault level of the testing machine by comparing the deviation with a predefined threshold, wherein the predefined threshold indicates a maximum tolerance level up to which the testing machine is considered to be fit. The at least one processor may be further configured to determine, during run-time, the maintenance required for the testing machine based on the fault level.

In another non-limiting embodiment of the present disclosure, the present application discloses a non-transitory computer readable media storing one or more instructions for facilitating predictive maintenance of a testing machine executable by at least one processor. The one or more instructions executable by the at least one processor cause the at least one processor to receiving plurality of tested data of a plurality of products being tested by the testing machine, wherein each tested data comprises a one or more output parameters generated by the testing machine on providing one or more input parameters associated with the product. The one or more instructions executable by the at least one processor cause the at least one processor to non-transitory computer readable media may further comprise one or more instructions for applying a predictive model, having predictive model parameters, upon the plurality of tested data in order to predict a plurality of future test data corresponding to the plurality of products. The one or more instructions executable by the at least one processor cause the at least one processor to apply a predictive model, having predictive model parameters, upon the plurality of tested data in order to determine a deviation between the plurality of tested data and the plurality of future test data, wherein the deviation indicates fault in the testing machine. The one or more instructions executable by the at least one processor cause the at least one processor to apply a predictive model, having predictive model parameters, upon the plurality of tested data in order to determine a fault level of the testing machine by comparing the deviation with a predefined threshold, wherein the predefined threshold indicates a maximum tolerance level up to which the testing machine is considered to be fit. The one or more instructions executable by the at least one processor cause the at least one processor to apply a predictive model, having predictive model parameters, upon the plurality of tested data in order to determine, during run-time, the maintenance required for the testing machine based on the fault level.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Further aspects and advantages of the present disclosure will be readily understood from the following detailed description with reference to the accompanying drawings. Reference numerals have been used to refer to identical or functionally similar elements. The figures together with a detailed description below, are incorporated in and form part of the specification, and serve to further illustrate the embodiments and explain various principles and advantages, in accordance with the present disclosure wherein.

Figure 1:
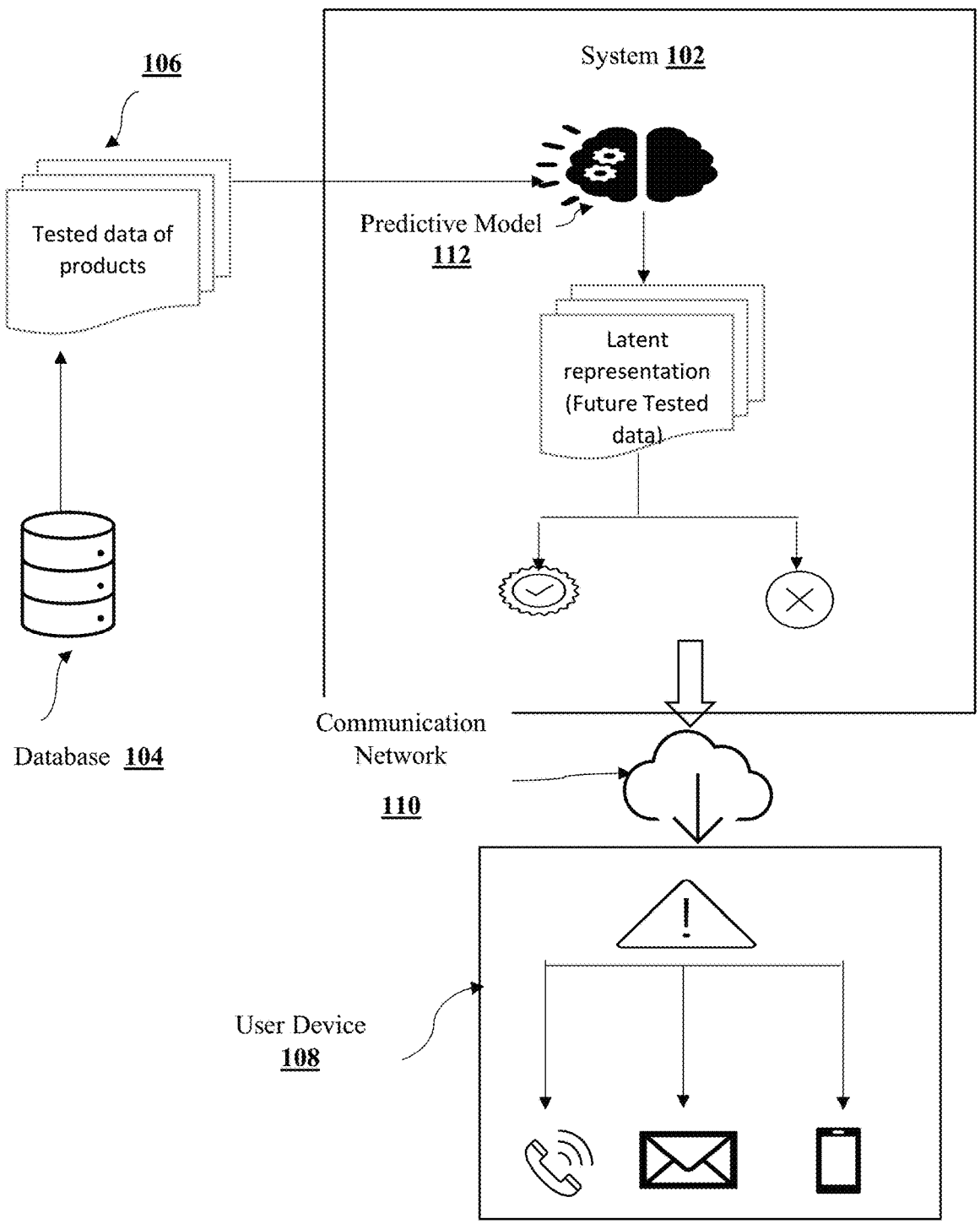
FIG. 1 shows an exemplary environment 100 for facilitating predictive maintenance of a testing machine, in accordance with some embodiments of the present disclosure.

It should be appreciated by those skilled in the art that any block diagrams herein represent conceptual views of the illustrative systems embodying the principles of the present disclosure. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present disclosure described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however, that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

The terms like "at least one" and "one or more" may be used interchangeably throughout the description. The terms like "a plurality of" and "multiple" may be used interchangeably throughout the description. Further, the terms like "maintenance" and "predictive maintenance" may be used interchangeably throughout the description.

In the present disclosure, the term "Predictive maintenance" is used within the context of its broadest definition. Predictive maintenance techniques are designed to determine the condition of in-service equipment (e.g., testing machine) in order to estimate when maintenance should be performed. This approach promises cost savings over scheduled or time-based preventive maintenance. Predictive maintenance may be in the form of identification of faults in respect of components ahead of time or timely calibration of components to prevent the failure of testing machine. It becomes quite important when any machine (i.e., testing machine, used throughout the specification) itself during operation or in working state provides alert to an engineer or maintenance team about its working condition (i.e., healthy, or deteriorated state) ahead of time along with the explanation regarding its reason of failure and exact component(s) which requires repair or replacement. The explanation about reason of failure or deteriorated state may be provided in any form, but not limited to text, alarming sound, call, email, or any other mode of communication.

In the present disclosure, the term "Remaining useful life (RUL)" is used within the context of its broadest definition. RUL is the length of time a machine is likely to operate before it requires repair or replacement.

As discussed in the background section, it is often observed that repair or replacement of components of the testing machine is not required during each maintenance cycle and leads to unnecessary downtime for the testing machine. Thus, it is really required to save the resources by getting the information about the deteriorated state of the testing machine ahead of time. Further, it may also provide ease to an engineer to know the reason behind the deteriorated state of testing machine along with list of components which may require replacement or repair and the time available with the engineer for such repair and replacement.

Notifying or alerting the operator of the testing machine to indicate the failures and critical state of the components of the testing machine during the run-time is one of the objective of the present disclosure. The testing machine based on the predictive modelling technique periodically sends notifications to the maintenance team in different modes like SMS, EMAIL and other messaging options along with information such as which component(s) and parameters are in a critical state with their failure confidence score and the remaining lifetime of the component. It assists a plant operator to schedule and fixing the tester failure in a short amount of time.

The conventional techniques used for predictive maintenance systems utilize historical data for analysing the time available with the testing machine for repair or replacement. For example, gamma distributions (a probability distribution technique) have been used to build a predictive maintenance system. These distributions are used based on the assumptions that degradation takes places slowly in tiny increments. However, the problem with such statistical models is that the data generating process to model the process is based on assumptions only, which may provide inaccurate results and is also time consuming.

One challenge in predicting the deteriorated state of the testing machine arises when the systems don't have dedicated health monitors for the testing machine. These health monitors measures only certain parameters of testing components. Using these measurements, simple models could be developed to predict the future state of the testing machine. However, when testing machine does not have direct health monitors the challenge arises. In most industrial testers the data available are the testing results of the component tested. Also, maintenance logs of the tested components are analyzed manually when the testing machine is taken down for maintenance.

Another challenge associated with predictive maintenance is that the manufacturing industries provides vast amount of unlabeled data for analysis and a very minimal labeled data. Thus, it becomes very difficult to retrieve accurate information from such unlabeled data.

Due to the above-mentioned challenge, predictive maintenance is still regarded as a complex problem, and to address this problem, the present disclosure proposes a solution that uses Deep Learning (DL) based Feature Extractor to generate features which are relevant for predictive maintenance tasks. In the present disclosure predictive maintenance is facilitated with the help of latent variable modeling (LVM) which helps in understanding the health of the testing machine using the measurements given by the testing machine for each component tested. Self-Supervised Representation Learning (SSRL) uses feature extractor which enables utilization of the vast amount of unlabeled data generated in manufacturing. The representations from SSRL are used in predictive maintenance prediction with minimal amount of labeled data. In this way, an effective and efficient system is proposed to predict about state of the testing machine during run-time along with the explanations for alerting the operator of the testing machine.

In the following detailed description of the embodiments of the disclosure, reference is made to the accompanying drawings that form a part hereof, and which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Referring now to FIG. 1, which illustrates an exemplary environment 100 for facilitating predictive maintenance of testing machine, in accordance with some embodiments of the present disclosure. It must be understood to a person skilled in art that the system may also be implemented in various environments, other than as shown in FIG. 1.

According to FIG. 1, a database or data source 104 may be a repository of tested data of products which may be retrieved by the system 102. In an exemplary embodiment, the product may be integrated circuit boards manufactured in the semiconductor industry. In another scenario, the product may be water motors manufactured in the industry. In similar way, there are various manufacturing industries which uses testing machines for testing the quality of their manufactured goods/products. With each product, there are input and output parameters associated therewith that helps in testing of the product. Further, once the testing machine performs testing of the product, tested data is generated corresponding to each product. Each tested data may comprise one or more output parameters generated by the testing machine on providing one or more input parameters associated with the product. For example, the input parameters for testing machine of the Integrated circuit board (i.e., product) may include, for example, an electric field, a magnetic field, and a temperature whereas the output parameters for the same product (IC board) may include, for example, a voltage swing and current. The process starts with providing a plurality of tested data corresponding to a plurality of products (already being tested by the same testing machine) to the system 102. With this, the system 102 gets an input data in a form of plurality of tested data for further processing. Now, the system 102 applies a modelling technique upon the plurality of tested data. In an exemplary embodiment, the modelling technique is predictive modelling technique (e.g. Latent Variable Modelling) where tested data is provided as an input to the model to obtain future tested data. The main aim of the latent variable modelling is to model the probability distribution of the tested data with latent variables.

According to an embodiment, the tested data is preprocessed before providing to the system 102. Pre-processing the tested data may comprise converting the input and output parameters obtained from the testing machine for a plurality of products (which may be in any format including, but not limited to, text, images, word files, web pages, excel, PDFs etc.) into a defined format (e.g., image or pdf). After the pre-processing of the tested data, measurements of the features of the components of the testing machine are extracted from it. The extracted features are used as input for Machine Learning (ML) based predictive model 112 which after processing provides predictive maintenance related predictions. Predictive maintenance predictions specify a future state of the tested data and provide confirmation about the fit or unfit status of the testing machine, that is represented using right tick symbol or cross symbol in FIG. 1. Right tick symbol presents fit state of the testing machine, whereas the cross symbol presents unfit or deteriorated state of the testing machine or its components. Based on the status of the testing machine, an alert is provided to the user device 108 to take future course of action. The alert may be provided in a form of a messages, calls or alerting sounds or visual graphics or a combination thereof. Additionally, explanations for the predictions are also passed to the user device 108. According to an embodiment, the user device 108 may belong to an operator or a person/authority responsible for maintaining the testing machine.

Figure 2:
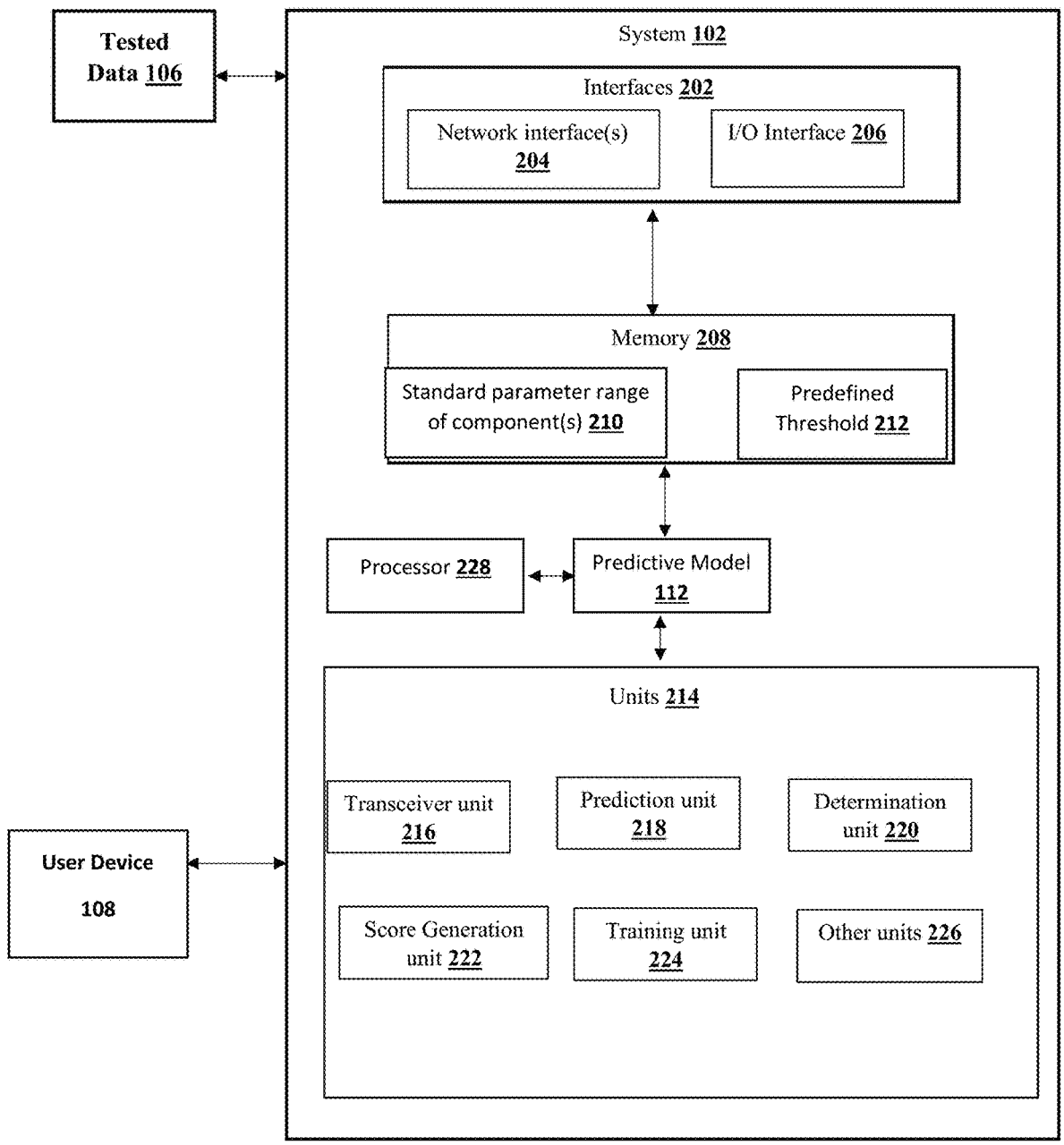
FIG. 2 shows a block diagram 200 of the system 102 for facilitating predictive maintenance of the testing machine is illustrated in FIG. 1, in accordance with some embodiments of the present disclosure.
Figure 3:
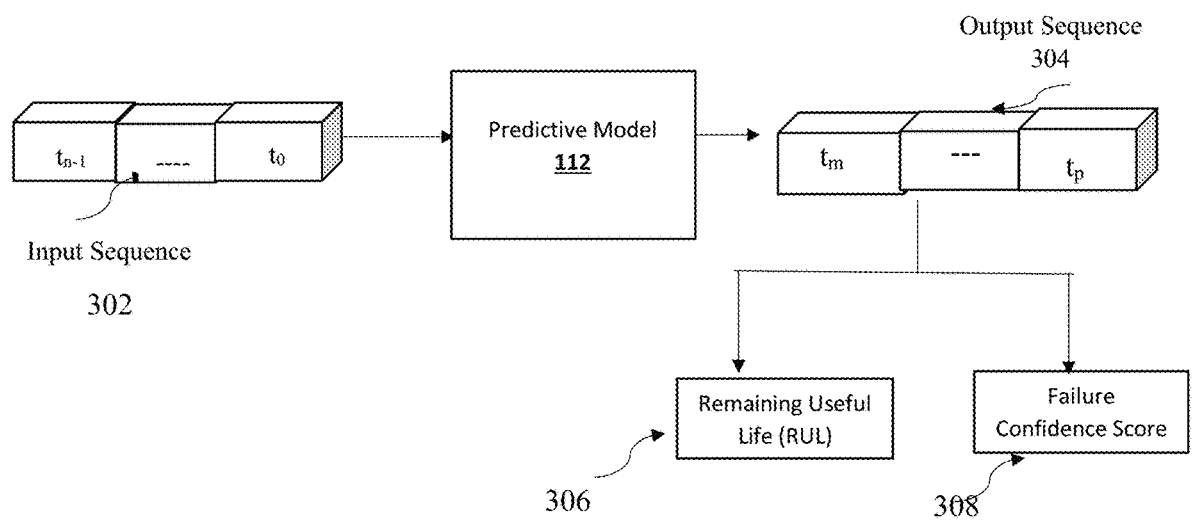
FIG. 3 depicts a process flow diagram 300 for defining factors required for determining predictive maintenance of the testing machine, in accordance with some embodiments of the present disclosure.
Figure 4A:
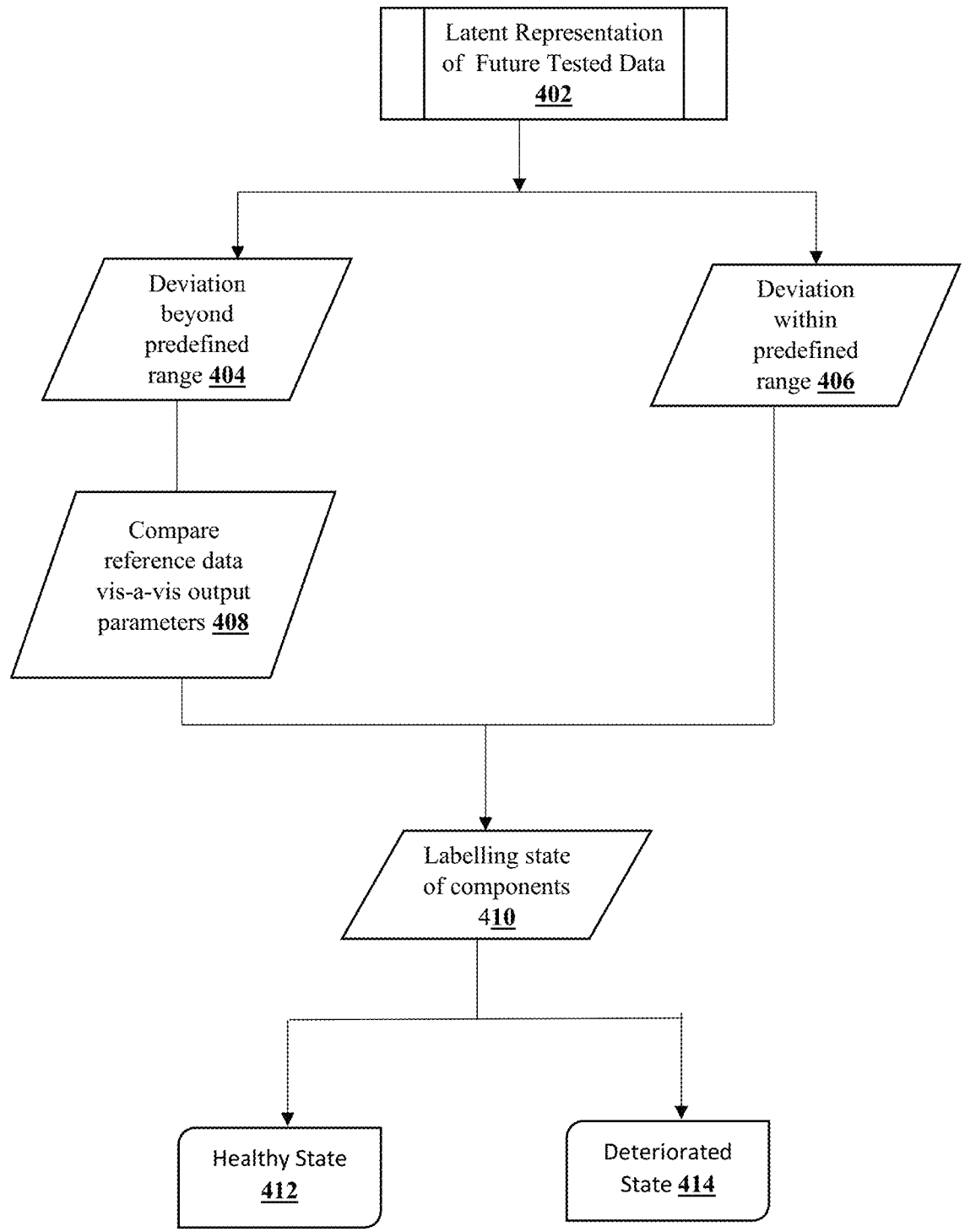
FIG. 4(a) shows a process flow diagram 400-1 for labelling state of components, in accordance with some embodiments of the present disclosure.
Figure 4B:
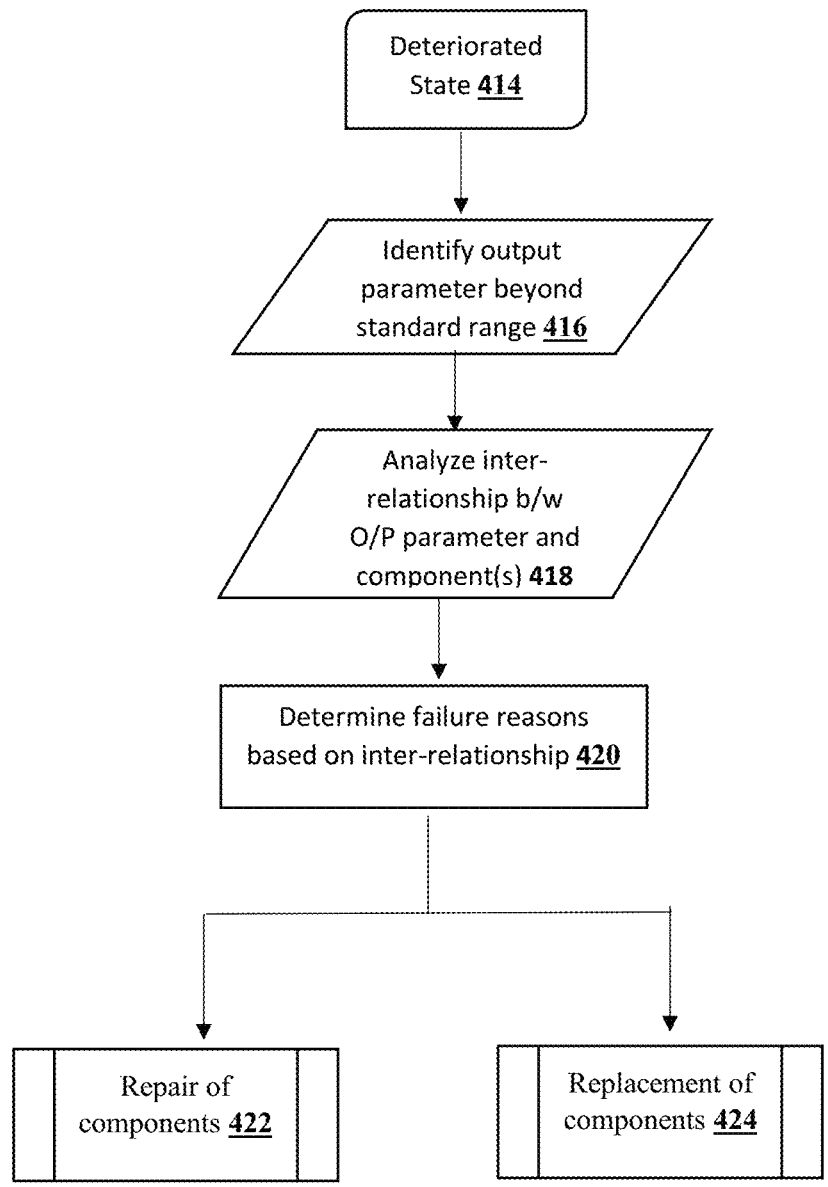
FIG. 4(b) shows an extended flow diagram 400-2 to express detailed reasoning of deteriorated state of the testing machine and notifying the operation for action to be taken, in accordance with some embodiments of the present disclosure.

The detailed explanation of the exemplary environment 100 is explained in conjunction with FIGS. 2, 3, 4a and 4b. FIG. 2 shows a block diagram 200 of a system 102 for facilitating predictive maintenance of a testing machine. Further, FIGS. 3, 4a and 4b shows process flow diagrams 300, 400-1, 400-2 which further describes various functionalities of the system 102. Though this specification, for simplicity and consistency, will refer to the system 102 as a server, which typically performs operations of the present disclosure, those of ordinary skill in the art will appreciate that the disclosed system 102 can also be implemented in various other computing systems like a computer stationed in a premises of an industry or a manufacturing plant where testing machine is located, a mobile device of an operator responsible for performing various operations (e.g. quality check) of components/products manufactured in the industry or manufacturing plant on the testing machine, or a dedicated sensing device placed above/along with a conveyor belt carrying the manufactured components/products, or in any other environment in which the testing machine is implemented. It may be understood that the system 102 may be accessed by multiple users through one or more user devices or applications residing on the user devices. In one implementation, the system 102 may comprise the cloud-based computing environment in which a user may operate individual computing systems configured to execute remotely located applications. Examples of the user devices may include, but are not limited to, a IoT device, IoT gateway, portable computer, a personal digital assistant, a handheld device, and a workstation. The user device 108 is communicatively coupled to the system 102 through a network 110.

In one implementation, the network 110 may be a wireless network, a wired network, or a combination thereof. The network 110 may be implemented as one of the different types of networks, such as intranet, local area network (LAN), wide area network (WAN), the internet, and the like. The network 110 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 110 may include a variety of network devices, including routers, bridges, servers, computing devices, storage devices, and the like.

In one implementation, the system 102 may comprise an interface 202, a memory 208, a predictive model 112, units 214 and a processor 228. The memory 208 may be communicatively coupled to the processor 228 and the units 216. In an exemplary embodiment, the processor 228 may be as one or more microprocessors, microcomputers, microcontrollers, digital signal processors, central processing units, state machines, logic circuitries, and/or any devices that manipulate signals based on operational instructions. Among other capabilities, the processor 228 is configured to fetch and execute computer-readable instructions stored in the memory 208.

The interface 202 may include a variety of software and hardware interfaces, for example, a web interface, a network interface, an Input/Output interface, a graphical user interface, and the like. The I/O interface 204 may allow the system 102 to interact with the user directly or through the user devices 108. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting many devices to one another or to another server. The network interface 206 may allow the system 102 to interact with one or more data sources 104 either directly or via the network 110.

In one implementation, the units 214 may comprise a transceiver unit 216, a prediction unit 218, a determination unit 220, a score generation unit 222, a training unit 224, and other units 226. The other units 226 may be used to perform other functions of the system 102 which are not described in the specification for the sake of brevity. According to embodiments of present disclosure, these units 216-226 may comprise hardware components like processor, microprocessor, microcontrollers, application-specific integrated circuit for performing various operations of the system 102. In another embodiment, the units 216-226 may be software modules stored in the memory 208 which may be executed by the at least one processor 228 for performing the operations of the system 102. It must be understood to a person skilled in art that the processor 228 may also perform all the functions of the units 216-226 according to various embodiments of the present disclosure.

In an exemplary embodiment, the transceiver unit 216 receives the plurality of tested data 106 from the external data source or database 104. In other embodiment, the transceiver unit 216 may also fetch the plurality of tested data 106 already stored in its memory 208. Each tested data 106 comprises one or more output parameters generated by the testing machine on providing one or more input parameters associated with the product at the time of testing. The input and output parameters may vary as per the product used for testing in the testing machine. For example, the input parameters for the product to be tested, for example, Integrated circuit board, may include an electric field, a magnetic field, and a temperature whereas, the output parameters for the IC board may include voltage swing and current. The transceiver unit 216 further provides the tested data 106 to the predictive model 112 for predicting the future test data. In an exemplary scenario, the predictive model 112 may use latent variable modelling (LVM) technique to predict the future test data. In other scenario, the predictive model 112 uses another deep learning modelling technique to capture latent representation of the tested data. Various measurements given by the testing machine for each product tested may serve a single data point. In this way, a series of data points/tested data (e.g., input sequence, 302 of FIG. 3) may be provided to the predictive model 112 for predicting the future test data. In an exemplary embodiment, the recent sequence of measurements from testing machine is used as tested data to predict the future sequence of measurements that testing machine could emit. In another exemplary embodiment, the tested data may be provided in the form of an input sequence 302 (FIG. 3) which defines the tested data obtained from the testing machine in the past and at a given point of time. For example, the input sequence 302 provided to the predictive model 112 is $t_{n-1}, t_n, \ldots, t_0$ which defines the tested data generated by the testing machine at $n-1^{th}$ interval, $n^{th}$ interval and at $0^{th}$ time interval respectively. Once the input sequence is provided to the predictive model 112, the predictive model 112 performs the latent variable modelling on the input sequence (i.e. tested data) to generate output sequence i.e. a future test data.

Particularly, the prediction unit 218 implements the predictive model 112 on the plurality of tested data/input sequence 106, 302 (FIG. 3) to predict plurality of future test data corresponding to the plurality of products. Predictive model 112 may use any sequential deep learning algorithm (RNN, LSTM, Transformers, CNN, Bi-LSTM) that is capable of learning present to future mapping for generation of future test data from the tested data. In an exemplary embodiment, Long Short-Term Memory (LSTM) networks may be used in sequence prediction of the future tested data. In another exemplary embodiment, Bidirectional long-short term memory (Bi-LSTM) technique is used that has the ability to consider both past and future sequences for output prediction. In this embodiment, the tested data provided as an input sequence 302 to the predictive model 112 i.e., $t_{n-1}, t_n, \ldots, t_0$, after the mapping, provides an output sequence 304 i.e. $t_m, t_{m+1}, \ldots, t_p$ which represent latent representation of tested data called as future test data. Particularly, the plurality of future test data is latent representation of the plurality of tested data 106.

The determination unit 220 works in conjunction with the prediction unit 218 to determine a deviation between the plurality of tested data/input sequence 106, 302 (FIG. 3) and the plurality of future test data 304. The deviation indicates fault in the testing machine. Once, it is determined that there exists a deviation between the tested data and future test data, the determination unit 220 further determines a fault level of the testing machine by comparing the deviation with a predefined threshold 212. The predefined threshold 212 is stored in the memory 208 of the system 102. The predefined threshold 212 may be set by the operator of the testing machine or the testing machine is trained to automatically set a threshold limit based on the historical data. The predefined threshold indicates a maximum tolerance level up to which the testing machine is fit. For example, power of the motor as per tested data is 140 watts. However, the prediction unit 218 upon implementing the predictive model 112 on the tested data predicts the power of the motor as 220 watts. Thereafter, the determination unit 220, based on the predefined threshold of the power (which may be kept as for example, 200 watts), indicates a deviation or a fault level in the testing machine. Based on the fault level, the determination unit 220 determines whether maintenance is required for the testing machine or not.

Particularly, every component of the testing machine is provided with a standard parameter range. Whenever future test data corresponding to the tested data indicates a deviation or presents its faulty state (i.e. deviation is beyond a predefined threshold), it becomes crucial to know about the status of its components. To know the status of the components of the testing machine, the determination unit 220 compares reference data i.e., the standard parameter range vis-à-vis the output parameter of each component to determine the health status of the component. In an exemplary embodiment, the determination unit 220 compares the reference data of the one or more components of the testing machine with the future test data obtained corresponding to the one or more components. Based on this comparison, labelling regarding status of the one or more components is performed. In an exemplary embodiment, the testing machine comprises three components 'X', 'Y' and 'Z'. The standard parameter range of component 'X' is defined as per data sheets is 10-20. However, as per the future test data, the output parameter for component 'X' presents the value as 15. The determination unit 220 determines that the output parameter of component 'X' is falling with in the standard parameter range defined for component 'X'. This means that component 'X' should be labelled as fit or healthy. Similarly, the health status of other component 'Y' is checked where the standard parameter range defined of component 'Y' (i.e. 30-35) is compared with the output parameter retrieved i.e. 38. Thus, for component Y, the determination unit 220 indicates that the output parameter is going beyond the standard parameter range. Accordingly, labelling of component 'Y' is performed as Unfit or Deteriorated. Accordingly, determination unit 220 based on comparison (408 of FIG. 4a) of standard parameter ranges and the output parameters retrieved from the future test data, labels (410 of FIG. 4a) the status of the components as healthy (412 of FIG. 4a) and deteriorated (414 of FIG. 4a). In other words, the component status is labelled as healthy (412) if the output parameters predicted for the component on the basis of future test data is meeting the expected standard range, whereas it is labelled as deteriorated (514) if the output parameter predicted for the component on the basis of future test data is going beyond the expected range. Same is presented in Table 1.

TABLE 1

| Component list | Standard parameter Range | Output predicted based on Future test data | Status |
| --- | --- | --- | --- |
| X | 10-20 | 15 | Healthy |
| Y | 30-35 | 38 | Deteriorated |
| Z | 10-18 | 15 | Healthy |

Once the components which are deteriorated are identified (414), in next step (416 of FIG. 4b), the determination unit 220 determines one or more failure reasons of the deteriorated components. For this, the determination unit 220 determines at least one output parameter of the one or more output parameters that are going beyond the standard parameter range. Then, the determination unit 220 analyzes inter-relationship between the at least one output parameter with the one or more components of the testing machine to identify the exact component which is in deteriorated state. For example, the determination unit 220 identifies that the output parameter "temp" and "voltage" are going beyond the standard parameter range. Thereafter, the predictive model 112 identifies the inter-relation between the component(s) with the output parameters "temp" and "voltage". Based on this identification, it is identified that the output parameter "temp" is linked with component 'W' and 'Y'. In the same way, the output parameter "voltage" is also going beyond the standard parameter range and the components 'Y' and 'Z' are contributing towards realization of output parameter "voltage". Thus, considering the output parameters and one or more component relationship, the predictive model 112 may decide the reason of failure or deteriorated state of the component(s) and the exact component that may require attention of a user or operator of the testing machine (as presented in Table 2, produced below).

TABLE 2

| Output parameters | Affected components | Status |
| --- | --- | --- |
| Temp | X, Z | Healthy |
| Voltage | Y, Z | Deteriorated |
| Radiation | X, R | Healthy |
| Mechanical stress | W, Y | Deteriorated |

As the component X is related to or affected with output parameter "Temp" and "radiation" and the status is confirmed as healthy, so there is no requirement for sending an alert to the operator for component 'X'. Whereas the component 'Y' is considered as deteriorated as per table 1 and table 2 and requires attention of the operator. Based on analysis of inter-relationship of output parameters and the components involved, the possible reasons of failures may be identified as voltage and mechanical stress. Thus, based on the logics behind the inter-relationship of the components, exact identification of the deteriorated component along with the possible reason(s) of failure is provided for notifying operator of the testing machine through user device 108.

Along with the identification of the deteriorated components and their reason of failure, the present disclosure also provides insight about what kind of service is required as corrective measures for faulty/deteriorated components. The predictive model 112 may also monitor the relationship between the tested data and future test data representations through the non-linear function and predict the remaining useful life (306 of FIG. 3) for the components of the testing machine. It helps the operator to prepare materials for maintenance in advance and this leads to reduction in the maintenance time as well. Further, regarding the corrective measures of the deteriorated components, the score generation unit 222 generates a failure confidence score (308 of FIG. 3) by analysing the future test data retrieved from the latent representation of tested data. The failure confidence score provides a probability of failure of the component(s) in future. Based on that probability or failure confidence score, one may analyze the type of fault level i.e., low, mid, or high. This may help the operator or user of the testing machine to categorize the fault level and also provides information to the user regarding repair and replacement (422, 424 of FIG. 4b). Particularly, if the failure confidence score is identified in low level range, then only repair of the component is required. In another scenario, if the failure confidence score is identified in mid-level range, then the component may be replaced for smooth functioning of the testing machine. In another scenario, if the failure confidence score is identified as high-level range, then in such situation, calibration is performed and based on the calibration any measurement uncertainty is minimized and it leads to ensuring the accuracy of testing machine. With the help of calibration, the component which is in deteriorated state may quantifies and controls errors or uncertainties within acceptable level. Beyond the high-level range, if there is a serious concern, in such kind of exceptional scenarios, the operator may be guided for replacing a major portion of the testing machine like a section.

In an exemplary scenario, as presented in table 3, the components 'X', 'Z', 'Y' and 'W' are identified to be in deteriorated state. As these are identified in deteriorated state, the failure confidence score for these components is determined from the latent representation of future test data. For example, the failure confidence of components 'X', 'Z', 'Y' and 'W' are identified to be 15, 6, 46 and 67. Considering these scores, the ranges of fault levels, components are categorized with respect to fault level. For example, when components 'X' and 'Z' are falling in the category of low-level range fault, the transceiver unit 216 sends a notification regarding repair of components 'X' and 'Z' to the operator. Similarly, the transceiver unit 216 sends a notification regarding replacement of component 'Y' to the operator since the component 'Y' is falling under the category of mid-level range. For component 'W', which is falling in the high level range, the determination unit 220 determines how much calibration is required. Thereafter, the transceiver unit 216 sends a notification regarding calibration to the operator. In worst case scenario, if in a section, majority of components are in high-level range of fault, then a notification regarding replacement of a particular section is provided to the operator in such case, the complete section should be replaced.

TABLE 3

| Components identified in deteriorated state | Failure confidence score | Fault level* | Notification to be sent to operator for course of action |
| --- | --- | --- | --- |
| X | 15 | Low-level | Repair |
| Z | 6 | Low-level | Repair |
| Y | 46 | Medium | Replacement |
| W | 67 | High-level | Calibration |

*Low-level: 1-20, mid-level: 21-50, high-level: 51 and above

In another exemplary embodiment, instead of all other units 216-226 as described above, the processor 228 may perform all the functions performed by the various units and monitors the health of the testing machine on regular basis with the help of future test data (Latent Representations) generated by the predictive model 112. This analysis provides recommendation for the maintenance of the testing machine and predict the current state of the testing machine to avoid unanticipated failures.

Further, the training unit 224 monitors the analysis performed by various units 216-226 and is trained for various scenarios and for various inter-relationship of the components of the testing machine. Accordingly, it may provide required data and training set to the predictive model 112 to predict exact health state of the testing machine and may also predict the requirement of maintenance. The training phase has not been explained in detail in the present disclosure and it is assumed that a person skilled in the art may carry out the training of models using the conventional training methods. The training operations may be performed by the at least one processor 228 either alone or in conjunction with the training unit 224 of FIG. 2.

Figure 5:
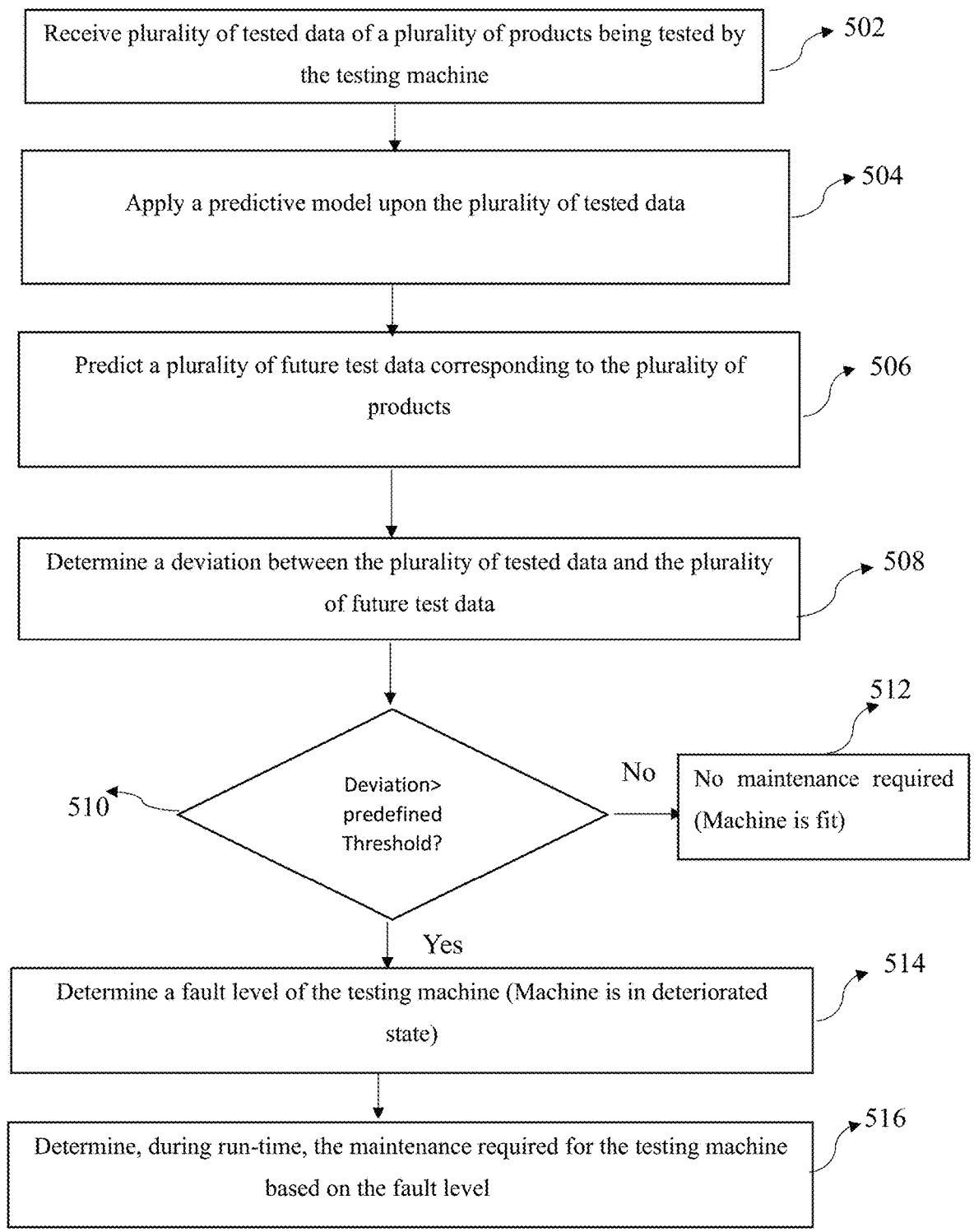
FIG. 5 shows a flowchart 500 illustrating a method for facilitating predictive maintenance of the testing machine, in accordance with some embodiments of the present disclosure.

Referring now to FIG. 5, a flowchart is described illustrating an exemplary method 500 for facilitating the predictive maintenance of testing machine, according to an embodiment of the present disclosure.

At block 502, the method receives a plurality of tested data of a plurality of products being tested by the testing machine. In particular, the measurements related to tested products are collected in the database. For facilitating predictive maintenance, features related to the measurement of the products tested by the testing machine (i.e., tested data) are extracted from the database (e.g., through Data Analysis Software/service). Each tested data comprises one or more output parameters generated by the testing machine on providing one or more input parameters associated with the product. The operations of block 502 may be performed by the at least one processor 228 or transceiver unit 216 of FIG. 2.

At block 504, the method applies a predictive model 112 upon the plurality of tested data. The predictive model may be deployed on the testing machine or in the cloud so that the model may be used efficiently. The operations of block 504 may be performed by the at least one processor 228 either alone or in conjunction with the prediction unit 218 of FIG. 2.

At step 506, the method utilizes the predictive model 112 and predict future state of test data. Any sequential deep learning algorithm (RNN, LSTM, Transformers, CNN, Bi-LSTM) that can learn present to future mapping could be used for generating the future test data. In a preferred embodiment, Bidirectional long-short term memory (Bi-LSTM) technique is used to learn this mapping as Bi-LSTM model has the ability to consider both past and future sequences for output prediction. The future test data which is derived from the latent represent information learnt by the model and the predictive model 112 keeps on analyzing the sequence patterns of the future test data using standard regression models to predict the health state of the testing machine. The operations of block 506 may be performed by the at least one processor 228 either alone or in conjunction with the determination unit 220 of FIG. 2.

At block 508, the method comprises determination of a deviation between the plurality of tested data and the plurality of future test data. The operations of block 508 may be performed by the at least one processor 228 either alone or in conjunction with the determination unit 220 of FIG. 2.

At block 510, the method comprises determining if the deviation is greater than a predefined threshold, labelling the testing machine as faulty else at step 512, labelling the testing machine as Fit. The operations of blocks 510, 512 may be performed by the at least one processor 228 either alone or in conjunction with the determination unit 220 and transceiver unit 216 of FIG. 2.

At block 514, the method comprises determination of a fault level of the testing machine by comparing the deviation with a predefined threshold. The predefined threshold indicates a maximum tolerance level up to which the testing machine is considered to be fit. The operations of block 514 may be performed by the at least one processor 228 either alone or in conjunction with the determination unit 220 of FIG. 2.

At block 516, the method comprises, determining, during run-time, the maintenance required for the testing machine based on the fault level. Once, the fault level is determined then according to fault level, the predictive model will provide the notification or alert to the operator of the testing machine. Such determination of fault level and sending of notification is performed during the run-time of the testing machine. There is no need to remove the testing machine for checking the fault level and for identifying the location of the fault or component. The operations of block 516 may be performed by the at least one processor 228 either alone or in conjunction with the determination unit 220 of FIG. 2.

The disclosed techniques of facilitating predictive maintenance are time efficient and consume few computing resources compared to the conventional techniques. The disclosed techniques have a higher accuracy compared to other techniques of predictive maintenance.

The above method 500 may be described in the general context of computer executable instructions. Generally, computer executable instructions can include routines, programs, objects, components, data structures, procedures, modules, and functions, which perform specific functions or implement specific abstract data types.

The order in which the various operations of the methods are described is not intended to be construed as a limitation, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

The various operations of methods described above may be performed by any suitable means capable of performing the corresponding functions. The means may include various hardware and/or software component(s) and/or module(s), including, but not limited to the processors 228 and various units of FIG. 2. Generally, where there are operations illustrated in Figures, those operations may have corresponding counterpart means-plus-function components.

In a non-limiting embodiment of the present disclosure, one or more non-transitory computer-readable media may be utilized for implementing the embodiments consistent with the present disclosure. Certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The terms "including", "comprising", "having" and variations thereof mean "including but not limited to", unless expressly specified otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the appended claims.

What is claimed is:

1. A method of facilitating predictive maintenance of a testing machine, the method comprising:
   receiving a plurality of tested data of a plurality of products being tested by the testing machine, wherein each tested data comprises one or more output parameters generated by the testing machine on providing one or more input parameters associated with a respective product of the plurality of products;
   applying a predictive model, having predictive model parameters, upon the plurality of tested data, including:
   performing a latent variable modelling technique on the plurality of tested data;
   predicting a plurality of future test data corresponding to the plurality of products based on the performed latent variable modelling technique, wherein the plurality of future test data is latent representation of the plurality of tested data;
   determining a deviation between the plurality of tested data and the plurality of future test data, wherein the deviation indicates fault in the testing machine;
   determining a fault level of the testing machine by comparing the deviation with a predefined threshold, wherein the predefined threshold indicates a maximum tolerance level up to which the testing machine is considered to be fit; and
   comparing, based on the determined fault level of the testing machine, one or more output parameters of the plurality of future test data vis-a-vis reference data, wherein the reference data indicates standard parameter range of the one or more components of the testing machine; and
   determining, during run-time, the maintenance required for the testing machine based on the comparison.

2. The method of claim 1, wherein the fault level includes a failure confidence score indicating a probability of failure of the testing machine in the future, and wherein the failure confidence score is derived from the latent representation of the plurality of tested data.

3. The method of claim 2, further comprising:
   determining a remaining life-time value of the testing machine based on the failure confidence score.

4. The method of claim 2, further comprising alerting an operator of the testing machine for:
   a. repairing one or more components of the testing machine when the failure confidence score is at a low level range;
   b. replacing the one or more components of the testing machine when the failure confidence score is at a mid level range; and
   c. performing calibration of one or more components when the failure confidence score is at a high level range.

5. The method of claim 1, when the deviation indicates the fault in the testing machine, the method further comprising:
   labelling, based on the comparing, the one or more components of the testing machine to be in:
   a healthy state if deviation in the one or more output parameters of the plurality of future test data is within the standard parameter range; and
   a deteriorated state if the deviation in the one or more output parameters of the plurality of future test data is beyond the standard parameter range.

6. The method of claim 5, wherein when the one or more components of the testing machine is found to be in the deteriorated state, the method further comprising identifying at least one component, among the one or more components, to be in the deteriorated state by:
   determining at least one output parameter of the one or more output parameters of the future test data going beyond the standard parameter range;
   analyzing inter-relationship between the at least one output parameter with the one or more components of the testing machine;
   determining one or more failure reasons of the at least one component of the one or more components for being into deteriorated state based on the inter-relationship; and
   notifying the one or more failure reasons to the operator of the testing machine.

7. A system for facilitating predictive maintenance of a testing machine, the system comprising:
   a memory; and
   at least one processor in electronic communication with the memory and configured to:
   receive a plurality of tested data of a plurality of products being tested by the testing machine, wherein each tested data comprises a one or more output parameters generated by the testing machine on providing one or more input parameters associated with a respective product of the plurality of products;
   apply a predictive model having predictive model parameters, upon the plurality of tested data, including:
   performing a latent variable modelling technique on the plurality of tested data:
   predicting a plurality of future test data corresponding to the plurality of products based on the performed latent variable modelling technique, wherein the plurality of future test data is latent representation of the plurality of tested data;
   determining a deviation between the plurality of tested data and the plurality of future test data, wherein the deviation indicates fault in the testing machine;
   determining a fault level of the testing machine by comparing the deviation with a predefined threshold, wherein the predefined threshold indicates a maximum tolerance level up to which the testing machine is considered to be fit; and comparing, based on the determined fault level of the testing machine, one or more output parameters of the plurality of future test data vis-a-vis reference data, wherein the reference data indicates standard parameter range of one or more components of the testing machine; and determine, during run-time, the maintenance required for the testing machine based on the comparison.

8. The system of claim 7, wherein the fault level includes a failure confidence score indicating a probability of failure of the testing machine in the future, and wherein the failure confidence score is derived from the latent representation of the plurality of tested data.

9. The system of claim 8, wherein the at least one processor is further configured to:
  determine a remaining life-time value of the testing machine based on the failure confidence score.

10. The system of claim 8, wherein the at least one processor is further configured to alert an operator of the testing machine for:
  a. repairing one or more components of the testing machine when the failure confidence score is at a low level range;
  b. replacing the one or more components of the testing machine when the failure confidence score is at a mid level range; and
  c. performing calibration of one or more components when the failure confidence score is at a high level range.

11. The system of claim 7, when the deviation indicates the fault in the testing machine, the at least one processor is further configured to:
  label, based on the comparing, the one or more components of the testing machine to be in:
    a healthy state if deviation in the one or more output parameters of the plurality of future test data is within the standard parameter range; and
    a deteriorated state if the deviation in the one or more output parameters of the plurality of future test data is beyond the standard parameter range.

12. The system of claim 11, wherein when the one or more components of the testing machine is found to be in the deteriorated state, the at least one processor is further configured to identify at least one component, among the one or more components, to be in the deteriorated state, the at least one processor is further configured to:
  determine at least one output parameter of the one or more output parameters of the future test data going beyond the standard parameter range;
  analyze inter-relationship between the at least one output parameter with the one or more components of the testing machine;
  determine one or more failure reasons of the at least one component of the one or more components for being into deteriorated state based on the inter-relationship; and
  notify the one or more failure reasons to the operator of the testing machine.

13. A non-transitory computer readable media storing one or more instructions for facilitating predictive maintenance of a testing machine executable by at least one processor, the one or more instructions executable by the at least one processor cause the at least one processor to:
  receive a plurality of tested data of a plurality of products being tested by the testing machine, wherein each tested data comprises a one or more output parameters generated by the testing machine on providing one or more input parameters associated with a respective product of the plurality of products;
  apply a predictive model having predictive model parameters, upon the plurality of tested data, including:
    performing a latent variable modelling technique on the plurality of tested data:
    predicting a plurality of future test data corresponding to the plurality of products based on the performed latent variable modelling technique, wherein the plurality of future test data is latent representation of the plurality of tested data;
    determining a deviation between the plurality of tested data and the plurality of future test data, wherein the deviation indicates fault in the testing machine;
    determining a fault level of the testing machine by comparing the deviation with a predefined threshold, wherein the predefined threshold indicates a maximum tolerance level up to which the testing machine is considered to be fit; and
    comparing, based on the determined fault level of the testing machine, one or more output parameters of the plurality of future test data vis-a-vis reference data, wherein the reference data indicates standard parameter range of the one or more components of the testing machine; and
  determine, during run-time, the maintenance required for the testing machine based on the comparison.

14. The non-transitory computer readable media of claim 13, wherein the fault level includes a failure confidence score indicating a probability of failure of the testing machine in the future, and wherein the failure confidence score is derived from the latent representation of the plurality of tested data.

15. The non-transitory computer readable media of claim 14, wherein the instructions executable by the at least one processor further cause the at least one processor to determine a remaining life-time value of the testing machine based on the failure confidence score.

16. The non-transitory computer readable media of claim 14, wherein the instructions executable by the at least one processor further cause the at least one processor to alert an operator of the testing machine for:
  a. repairing one or more components of the testing machine when the failure confidence score is at a low level range;
  b. replacing the one or more components of the testing machine when the failure confidence score is at a mid level range; and
  c. performing calibration of one or more components when the failure confidence score is at a high level range.

17. The non-transitory computer readable media of claim 13, when the deviation indicates the fault in the testing machine, the one or more instructions executable by the at least one processor further cause the at least one processor to:
  label, based on the comparing, the one or more components of the testing machine to be in:
    a healthy state if deviation in the one or more output parameters of the plurality of future test data is within the standard parameter range; and
    a deteriorated state if the deviation in the one or more output parameters of the plurality of future test data is beyond the standard parameter range.

18. The non-transitory computer readable media of claim 17, wherein when the one or more components of the testing machine is found to be in the deteriorated state, the instructions executable by the at least one processor further cause the at least one processor to identify at least one component, among the one or more components, to be in the deteriorated state by:
- determining at least one output parameter of the one or more output parameters of the future test data going beyond the standard parameter range;
- analyzing inter-relationship between the at least one output parameter with the one or more components of the testing machine;
- determining one or more failure reasons of the at least one component of the one or more components for being into deteriorated state based on the inter-relationship; and
- notifying the one or more failure reasons to the operator of the testing machine.

* * * * *